United States Patent
Blackmer et al.

(10) Patent No.: US 9,568,344 B2
(45) Date of Patent: Feb. 14, 2017

(54) VEHICLE INSTRUMENT PANEL WITH POINTER PRESENCE DETECTION

(71) Applicant: DELPHI TECHNOLOGIES, INC., Troy, MI (US)

(72) Inventors: Stephen C. Blackmer, Millington, MI (US); Steven A. Liburdi, Grosse Pointe Farms, MI (US)

(73) Assignee: Delphi Technologies, Inc., Troy, MI (US)

( * ) Notice: Subject to any disclaimer, the term of this patent is extended or adjusted under 35 U.S.C. 154(b) by 110 days.

(21) Appl. No.: 14/616,943

(22) Filed: Feb. 9, 2015

(65) Prior Publication Data
US 2016/0231149 A1   Aug. 11, 2016

(51) Int. Cl.
| | |
|---|---|
| *G01D 11/28* | (2006.01) |
| *G01D 13/26* | (2006.01) |
| *B60K 37/02* | (2006.01) |
| *G01P 1/08* | (2006.01) |
| *G01P 1/11* | (2006.01) |
| *F21V 23/04* | (2006.01) |

(52) U.S. Cl.
CPC ............ *G01D 13/265* (2013.01); *B60K 37/02* (2013.01); *F21V 23/0442* (2013.01); *G01D 11/28* (2013.01); *G01P 1/08* (2013.01); *G01P 1/11* (2013.01); *B60K 2350/402* (2013.01); *B60K 2350/408* (2013.01)

(58) Field of Classification Search
CPC ... G01D 13/265; G01D 5/142; F21V 23/0442; H01H 36/00; B60K 37/00
USPC .......................................... 362/23.01–23.22
See application file for complete search history.

(56) References Cited

U.S. PATENT DOCUMENTS

| | | | | |
|---|---|---|---|---|
| 6,326,781 | B1 * | 12/2001 | Kunde .................. | G01D 5/145 324/144 |
| 7,263,870 | B2 * | 9/2007 | Avitia .................... | G01D 3/022 250/231.11 |
| 2001/0039190 | A1 * | 11/2001 | Bhatnagar ............. | D06F 39/005 455/450 |
| 2009/0079712 | A1 * | 3/2009 | Levin .................... | G05G 9/047 345/184 |
| 2014/0033965 | A1 * | 2/2014 | Ookura .................. | G01D 11/28 116/288 |
| 2015/0035517 | A1 | 2/2015 | Blackmer et al. | |

* cited by examiner

*Primary Examiner* — Sean Gramling
(74) *Attorney, Agent, or Firm* — Lawrence D. Hazelton

(57) ABSTRACT

A vehicle instrument panel assembly includes a light source, a pointer, and a sensor. The light source is configured to emit light from a display surface of the assembly. The pointer overlies the display surface and is movable about an axis to an angle to point to indicia on the display surface. The pointer defines a hub portion and a needle portion that extends from the hub portion. The hub portion overlies the light source and includes a light-guide that guides light from the light source into the needle portion whereby the needle portion is illuminated. The sensor is located proximate to the hub portion. The sensor is configured to detect that the pointer is present regardless of the angle of the pointer.

5 Claims, 1 Drawing Sheet

VEHICLE INSTRUMENT PANEL WITH POINTER PRESENCE DETECTION

TECHNICAL FIELD OF INVENTION

This disclosure generally relates to a vehicle instrument panel assembly, and more particularly relates to an assembly configured to detect if or when a pointer of the assembly as fallen from the shaft on which it is supposed to be mounted.

BACKGROUND OF INVENTION

Vehicle instrument panel assemblies with mechanical pointers are known. In some instances the pointer is illuminated, and the light for illumination is provided by a light source located underneath the pointer. If the pointer falls off because of, for example, a collision, improper servicing or handling, or a manufacturing defect, the light source may annoy the operator of the vehicle, or possibly interfere with the operator's ability to see a roadway when driving at night.

SUMMARY OF THE INVENTION

In accordance with one embodiment, a vehicle instrument panel assembly is provided. The assembly includes a light source, a pointer, and a sensor. The light source is configured to emit light from a display surface of the assembly. The pointer overlies the display surface and is movable about an axis to an angle to point to indicia on the display surface. The pointer defines a hub portion and a needle portion that extends from the hub portion. The hub portion overlies the light source and includes a light-guide that guides light from the light source into the needle portion whereby the needle portion is illuminated. The sensor is located proximate to the hub portion. The sensor is configured to detect that the pointer is present regardless of the angle of the pointer.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
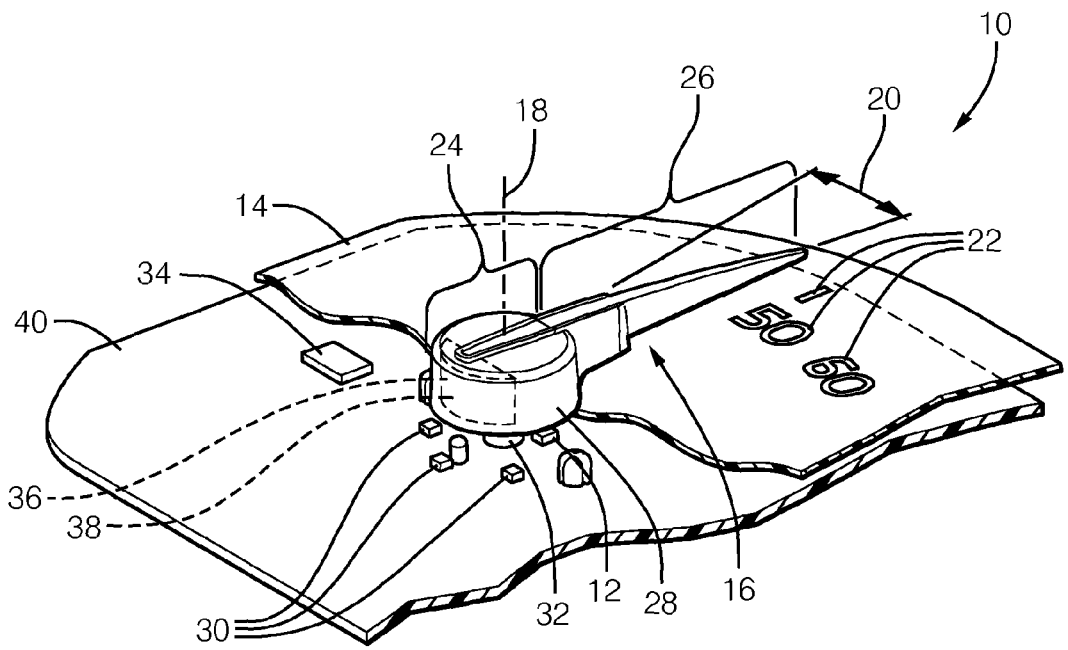
FIG. 1 is an isometric view of a portion of a vehicle instrument panel assembly in accordance with one embodiment.

FIG. 1 illustrates a non-limiting example of a portion of a vehicle instrument panel assembly, hereafter referred to as the assembly 10. The assembly includes a light source 12 configured to emit light from a display surface 14 of the assembly 10. That is, the light source 12 is not used to illuminate the display surface 14, but rather emits light up and out of the display surface 14 for reasons that will become apparent in the description that follows. Preferable, the light source 12 is a light emitting diode (LED) as such devices have long operating lives and do not generate unnecessary heat. However, it is not a requirement that the light source 12 is an LED, and other types of light sources such as an incandescent bulb could be used. The light source 12 and other electrical components described herein are preferable mounted on a circuit board 40 located under the display surface 14.

The assembly 10 also includes a pointer 16 that overlies the display surface 14 and is movable about an axis 18 to an angle 20 to point to indicia 22 on the display surface 14. The assembly 10 may include a stepper-motor (not shown) coupled to gears (not shown) that includes a shaft 32 aligned with the axis 18 and upon which the pointer 16 is mounted. The stepper-motor is operable to rotate the pointer 16 about the axis 18 to indicate, for example, the speed of a vehicle (not shown), as will be recognized by those in the art. The pointer 16 defines a hub portion 24 and a needle portion 26 that extends from the hub portion 24. The pointer 16 and the light source 12 are arranged so the hub portion 24 overlies the light source 12 such that the light source 12 is not directly viewable by an operator (not shown) of the vehicle. The hub portion 24 includes a light-guide 28 that captures and guides light emitted from the light source 12 into the needle portion 26 whereby the needle portion 26 is illuminated. The needle portion 26 and the light-guide 28 are preferably formed of a light transmitting polymeric compound which may be tinted so the needle portion 26 appears with a desired color.

The assembly 10 advantageously includes a sensor 30 located proximate to the hub portion 24. The sensor 30 is generally configured to detect that the pointer 16 is present regardless of the angle 20 of the pointer 16. That is, the sensor 30 is used to determine if the pointer 16 has fallen-off of the shaft 32 onto which the pointer 16 is mounted. If the sensor 30 indicates that the pointer 16 is not present, i.e. that the pointer 16 is not located where it is expected to be, the assembly 10 is advantageously configured to turn the light source 12 off so light emitted from the light source does not annoy the operator of the vehicle, or interfere with the operator's ability to see a roadway when driving at night. It should be appreciated that the sensor 30 is able to determine that the pointer 16 is present, i.e. properly mounted on the shaft 32, regardless of the angle 20 of the pointer 16. That is, the assembly 10 is not limited to determining that the pointer 16 is oriented at a particular angle for the purpose of verifying or calibrating the angular position control of the pointer 16.

In order to coordinate the detection of the presence of the pointer 16, the assembly 10 may include a controller 34 electrically coupled to the light source 12 and the sensor 30. The controller 34 may include a processor such as a microprocessor or other control circuitry such as analog and/or digital control circuitry including an application specific integrated circuit (ASIC) for processing data as should be evident to those in the art. The controller 34 may include memory, including non-volatile memory, such as electrically erasable programmable read-only memory (EEPROM) for storing one or more routines, thresholds and captured data. The one or more routines may be executed by the processor to perform steps for determining if signal(s) received by the controller 34 from the sensor 30 indicates that the pointer 16 is present on the shaft 32, as described herein. Accordingly, the controller 34 may be configured to turn-off the light source 12 when the sensor 30 indicates that the pointer 16 is not present, as suggested in FIG. 2.

The hub portion 24 may include a counter weight 36 so vehicle motion does not cause the angle 20 of the pointer 16 to fluctuate. The counter weight 36 may be advantageously formed of magnetic material so that the hub portion 24 includes a magnet 38 fixedly coupled to the pointer 16.

Accordingly, the sensor 30 may be configured to detect that the magnet 38 is proximate to the sensor 30 and thereby determine that the pointer 16 is present on the shaft 32. By way of example and not limitation, the sensor 30 may includes a plurality of Hall effect devices arranged proximate to the hub portion 24 to detect the presence of the magnet 38 regardless of the angle 20 of the pointer 16 as illustrated in FIG. 1.

If the angular range of the pointer is relatively narrow, ninety degrees of angle for example, only one Hall effect device may be required to form the sensor 30. However, if the angular range of the pointer is, for example two-hundred-forty degrees or more, the sensor 30 may require three or more Hall effect devices to be able to detect the presence of the pointer 16 equipped with the magnet 38 for all possible values of the angle 20. It should be recognized that there may be instance when not all of the Hall effect devices indicate that the magnet 38 is present because of the size of the magnet. That is, the controller 34 may be configured to indicate that the pointer 16 is present if at least one of the Hall effect devices detects the magnet 38.

In an alternative embodiment, the sensor 30 may be a light detector that cooperates with features present in the hub portion 24 to detect light from the light source 12 present therein. For example, part of the underside of the hub portion 24 may be light reflective to reflect light from the light source 12 into the sensor 30.

Figure 2:
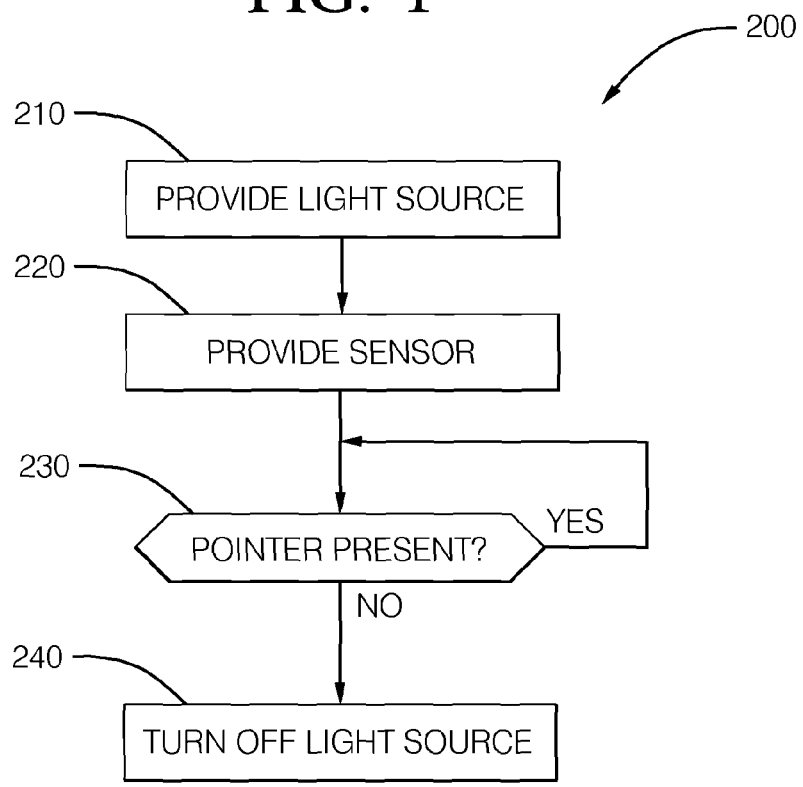
FIG. 2 is a flowchart of a method of operating the assembly of FIG. 1 in accordance with one embodiment.

FIG. 2 illustrates a non-limiting example of a method 200 of operating the assembly 10 shown in FIG. 1.

Step 210, "PROVIDE LIGHT SOURCE", may include installing the light source 12 into the assembly 10 so that light emitted by the light source 12 projects upward away from the display surface 14. This step may also include installing the pointer 16, or installing the pointer 16 may be done as part of another step of manufacturing the assembly 10.

Step 220, "PROVIDE SENSOR", may include installing a suitable sensor such as one or more Hall effect devices if the pointer 16 includes the magnet 38 described herein.

Steps 230 and 240 may be performed by the controller 34 as part of a larger program executed by the controller 34 for controlling the angle 20 of the pointer 16, as will be recognized by those in the art.

Step 230, "POINTER PRESENT?", may include the controller 34 receiving one or more signals from the sensor 30 depending on the number of devices that form the sensor 30. Depending on the configuration of the sensor 30 and the pointer 16, it may be that the controller 34 determines that the pointer is present if one or more of the devices that make up the sensor 30 indicates that the pointer 16 is present. In other words, the pointer 16 may be determined to be not present only if all of the devices that make up the sensor 30 indicate that the pointer 16 is not present.

Step 240, "TURN-OFF LIGHT SOURCE", may include the controller 34 operating a switch (not shown) to interrupt power to the light source 12.

Accordingly, a vehicle instrument panel assembly (the assembly 10) and, a method 200 of operating the assembly 10 is provided. Features of the assembly 10 and the method 200 provide for turning off the light source 12 if the pointer 16 falls off the shaft 32 in order to prevent annoying the operator of the vehicle, and/or prevent possible interference with the operator's ability to see a roadway when driving at night.

While this invention has been described in terms of the preferred embodiments thereof, it is not intended to be so limited, but rather only to the extent set forth in the claims that follow.

We claim:

1. A vehicle instrument panel assembly, said assembly comprising:
   a light source configured to emit light from a display surface of the assembly;
   a pointer that overlies the display surface and is movable about an axis to an angle to point to indicia on the display surface, wherein the pointer defines a hub portion and a needle portion that extends from the hub portion, wherein the hub portion overlies the light source and includes a light-guide that guides light from the light source into the needle portion whereby the needle portion is illuminated;
   a sensor located proximate to the hub portion, said sensor configured to detect that the hub portion is present; and
   a controller electrically coupled to the light source and the sensor, wherein the controller is configured to turn-off the light source when the sensor indicates that the pointer is not present.

2. The assembly in accordance with claim 1, wherein the hub portion includes a magnet fixedly coupled to the pointer, and the sensor is configured to detect that the magnet is proximate to the sensor and thereby determine that the pointer is present.

3. The assembly in accordance with claim 2, wherein the sensor includes a plurality of Hall effect devices arranged proximate to the hub portion to detect the magnet regardless of the angle of the pointer.

4. A vehicle instrument panel assembly, said assembly comprising:
   a light source configured to emit light from a display surface of the assembly in a direction from which the display surface is viewed;
   a pointer that overlies the display surface and is movable about an axis to an angle to point to indicia on the display surface, wherein the pointer defines a hub portion and a needle portion that extends from the hub portion, wherein the hub portion overlies the light source in a manner effective to block light directly from the light source and includes a light-guide that guides light from the light source into the needle portion whereby the needle portion is illuminated; and
   a sensor located proximate to the hub portion, said sensor configured to detect that the pointer is present, wherein the assembly includes a controller electrically coupled to the light source and the sensor, wherein the controller is configured to turn-off the light source when the sensor indicates that the hub portion is not present.

5. The assembly of claim 4, wherein the sensor is configured to be substantially parallel to the shaft to detect the pointer is present.

* * * * *